US007174325B1

(12) United States Patent
    Ascoli

(10) Patent No.: US 7,174,325 B1
(45) Date of Patent: Feb. 6, 2007

(54) NEURAL PROCESSOR

(75) Inventor: Giorgio A. Ascoli, Fairfax Station, VA (US)

(73) Assignee: George Mason Intellectual Properties, Inc., Fairfax, VA (US)

( * ) Notice: Subject to any disclaimer, the term of this patent is extended or adjusted under 35 U.S.C. 154(b) by 667 days.

(21) Appl. No.: 10/446,840

(22) Filed: May 29, 2003

Related U.S. Application Data

(60) Provisional application No. 60/386,576, filed on Jun. 7, 2002.

(51) Int. Cl.
    G06F 15/18    (2006.01)
    G06N 3/06     (2006.01)
    G06N 3/063    (2006.01)
    G06N 3/067    (2006.01)
(52) U.S. Cl. ..................................... 706/43
(58) Field of Classification Search ............. 706/43, 706/34
    See application file for complete search history.

(56) References Cited

U.S. PATENT DOCUMENTS 5,072,130 A * 12/1991 Dobson ................ 706/26
5,129,041 A *  7/1992 Pernick et al. ......... 706/40
5,214,745 A *  5/1993 Sutherland ............ 706/17
5,355,435 A * 10/1994 DeYong et al. ........ 706/26
5,666,518 A *  9/1997 Jumper ................. 703/23
6,363,369 B1 * 3/2002 Liaw et al. ............ 706/15

OTHER PUBLICATIONS

Kim, S. Waldron, M.B., "Spatiotemporal neural network using axodendritic chemical synapsemodel", Neural Networks, 1992. IJCNN., International Joint Conference on, Jun. 7-11, 1992, On pp. 389-394 vol. 1.*

* cited by examiner

Primary Examiner—Anthony Knight
Assistant Examiner—Michael B. Holmes
(74) Attorney, Agent, or Firm—David G. Grossman

(57) ABSTRACT

Disclosed is a digital neural processor comprising at least one neural processing element. The neural processing elements including at least one simulated dendrite and a simulated axon. Each of the simulated dendrites may include: a dendrite input capable of receiving at least one dendrite input signal and a dendrite signal propagation function capable of calculating a dendrite output signal in discrete time steps from each dendrite input signal. The signal propagation function may further include a delay parameter; a duration parameter; and an amplitude parameter. The simulated axon includes an axon input capable of receiving dendrite output signals, an axon function, capable of calculating an axon output signal from dendrite output signal(s) and an axon output capable of outputting the axon output signal.

14 Claims, 9 Drawing Sheets

| Concentration | P/P | P/D | D/P | D/D | pd/dp |
|---|---|---|---|---|---|
| Async rand | 0.511<br>0.519 | 0.582<br>0.606 | 0.629<br>0.651 | 0.935<br>0.861 | 0.928 |
| Sync rand | 0.564<br>0.566 | 1.080<br>1.201 | 0.611<br>0.660 | 1.020<br>1.070 | 1.795 |
| Async spike | 0.631<br>0.634 | 0.917<br>0.879 | 0.627<br>0.623 | 1.049<br>1.078 | 1.437 |
| Sync spike | 0.586<br>0.580 | 1.048<br>1.093 | 0.610<br>0.615 | 1.219<br>0.991 | 1.748 |
| Async burst | 0.840<br>0.855 | 0.986<br>0.994 | 0.804<br>0.766 | 1.146<br>1.141 | 1.261 |
| Sync burst | 0.680<br>0.696 | 1.088<br>0.963 | 0.752<br>0.743 | 1.108<br>1.141 | 1.372 |

FIG. 8

| Irregularity | P/P | P/P | P/P | P/P | pd/dp |
|---|---|---|---|---|---|
| Async rand | 16.51<br>16.34 | 16.13<br>16.26 | 16.18<br>16.26 | 17.17<br>17.40 | 0.998 |
| Sync rand | 16.59<br>16.89 | 17.43<br>16.21 | 16.51<br>17.58 | 17.34<br>17.59 | 0.987 |
| Async spike | 13.85<br>13.67 | 7.608<br>8.119 | 14.89<br>14.88 | 11.80<br>11.50 | 0.528 |
| Sync spike | 16.42<br>16.02 | 16.45<br>16.37 | 15.84<br>16.09 | 13.85<br>15.85 | 1.028 |
| Async burst | 14.47<br>14.12 | 10.94<br>10.95 | 15.63<br>15.51 | 12.57<br>13.07 | 0.703 |
| Sync burst | 16.82<br>16.64 | 16.60<br>17.51 | 16.76<br>16.63 | 16.32<br>15.93 | 1.021 |

FIG. 9

NEURAL PROCESSOR

CROSS-REFERENCE TO RELATED APPLICATIONS

The present application claims the benefit of provisional patent application Ser. No. 60/386,576 to Ascoli, filed on Jun. 7, 2002, entitled "Neural Processor," which is hereby incorporated by reference.

BACKGROUND OF THE INVENTION

The present invention relates to processing elements in neural networks. In particular, the present invention provides for digital neural processing elements that simulate neuron electrophysiology at subcellular levels. These digital neural processing elements when connected according to a neural topology may be used to solve a wide range of signal processing and data processing problems.

Artificial neural networks are computational mechanisms that are structured and act in a manner that is analogous to biological neurons. In its simplest form, an artificial neural network consists of a number of Neural Processing Elements (NPEs) interconnected via weighted connections. In artificial neural networks, the processing elements are typically called "neurons" and the connections are called "synapses". The signal lines from the neurons to synapses are called "axons", and those from the synapses to the neurons are called "dendrites". These elements are the "Standard Components" of the neural system. Each neuron is impinged upon by numerous synapses, which carry signals from neighboring neurons. The input signals are integrated by the dendrites of the neuron in the form of what are called the "post synaptic potential" (PSPs) until a critical threshold is reached, at which point an "action potential" (AP) is generated. In biological systems, the PSP is a continuous in time, continuous in amplitude signal, and the AP is a continuous in time, discrete in amplitude signal. The action potential is propagated down the axon to a synapse connecting the neuron with another neuron.

Although these elements can be quite simple, the large amount of them required to perform practical tasks makes their implementation complicated. The most common PE, in which incoming signals are summed and then convolved with a sigmoidal transfer function, embodies two basic assumptions. First, it is assumed that communication between neurons can be approximated by a slowly-varying scalar value, which is typically interpreted as the frequency of APs. Second, it is assumed that computation within neurons occurs instantaneously—i.e., that there is no delay between the arrival of an incoming signal and its effect on the output. While these assumptions are biologically unrealistic, they are generally viewed as providing an adequate approximation that is relatively straightforward to implement, from which practical computational studies can be effected.

Thus, classic neural network models employ basic computational units with no internal structure and a fixed temporal window for signal processing. Cable theory, in contrast, predicts that biological neurons integrate inputs differentially depending on the synaptic position on the dendritic tree. Specifically, the farther a connection is from the soma, the longer are the signal onset and duration, and the lower is the peak value. These electrotonic effects on dendritic integration are due to the interplay of passive membrane properties (resistance and capacitance). While many neuron classes in the central nervous system possess a variety of active (voltage-gated) channels on their dendrites, there is considerable experimental support for the basic passive mechanisms underlying dendritic integration. The connectivity of most major natural networks in the mammalian brain is organized in layers, such that specific feedforward, recurrent, and feedback projections each contact the target dendrites within precise ranges of electrotonic distances. This layered organization is observed, for example, in all major pathways in the cerebral cortex, hippocampus, and cerebellum. It is thus likely that dendritic integration and the anatomical organization of synaptic connectivity together constrain network dynamic, and, ultimately, plasticity and function.

Detailed dendritic passive models of single neurons are widely adopted in computational neuroscience, often complemented with active mechanisms. However, for larger scale simulations, simplified integrate-and-fire models are frequently adopted instead. Several types of integrate-and-fire models allow the inclusion of electrotonic effects on dendritic processing (e.g. in the form of time constants for signal rise and decay). However, large scale models are not built with layered synaptic architectures (e.g., with principal cells receiving proximal feedforward excitation, distal recurrent collaterals, and intermediate lateral inhibition) and corresponding electrotonic parameters. The activity dynamics in biological networks are exquisitely constrained by the connectivity and its relationship to electrotonic architecture. This relationship is presently not captured in available artificial neural network models.

What is needed is a neural processing element capable of modeling biological neurons with respect to electrotonic effects on dendritic integration. This neural process should be capable of simulating these electrotonic effects on the spike response dynamics of networks including feedforward and recurrent excitation.

BRIEF SUMMARY OF THE INVENTION

One advantage of the present invention is that it may provide a simple method of simulating single celled neuron activity.

Another advantage of this invention is that it may provide a mechanism for simulating large neuron structures.

A further advantage of this invention is that it may model structural neural network dynamics independent of complex physiological features.

Yet a further advantage of this invention is that it may provide for making computationally economic neural network computations.

To achieve the foregoing and other advantages, in accordance with all of the invention as embodied and broadly described herein, is a digital neural processor comprising at least one neural processing element. The neural processing element(s) may include at least one simulated dendrite and a simulated axon. Each of the simulated dendrites may include: a dendrite input capable of receiving at least one dendrite input signal and a dendrite signal propagation function capable of calculating a dendrite output signal in discrete time steps from each dendrite input signal. The signal propagation function may further include a delay parameter; a duration parameter; and an amplitude parameter. The simulated axon includes an axon input capable of receiving dendrite output signals, an axon function, capable of calculating an axon output signal from dendrite output signal(s) and an axon output capable of outputting the axon output signal.

In yet a further aspect of the invention, a neural processor wherein the axon output signal is generated by the axon function when the threshold is exceeded.

In yet a further aspect of the invention, a neural processor including a neural topology defined by connecting at least one axon output of a neural processing element with a dendrite input of another neural processing element.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated in and form a part of the specification, illustrate an embodiment of the present invention and, together with the description, serve to explain the principles of the invention.

FIG. 8 is a chart showing experimental results of firing concentrations from several network embodiments of the present invention.

FIG. 9 is a chart showing experimental results of firing irregularities from several network embodiments of the present invention.

REFERENCE NUMERALS IN DRAWINGS

Figure 1:
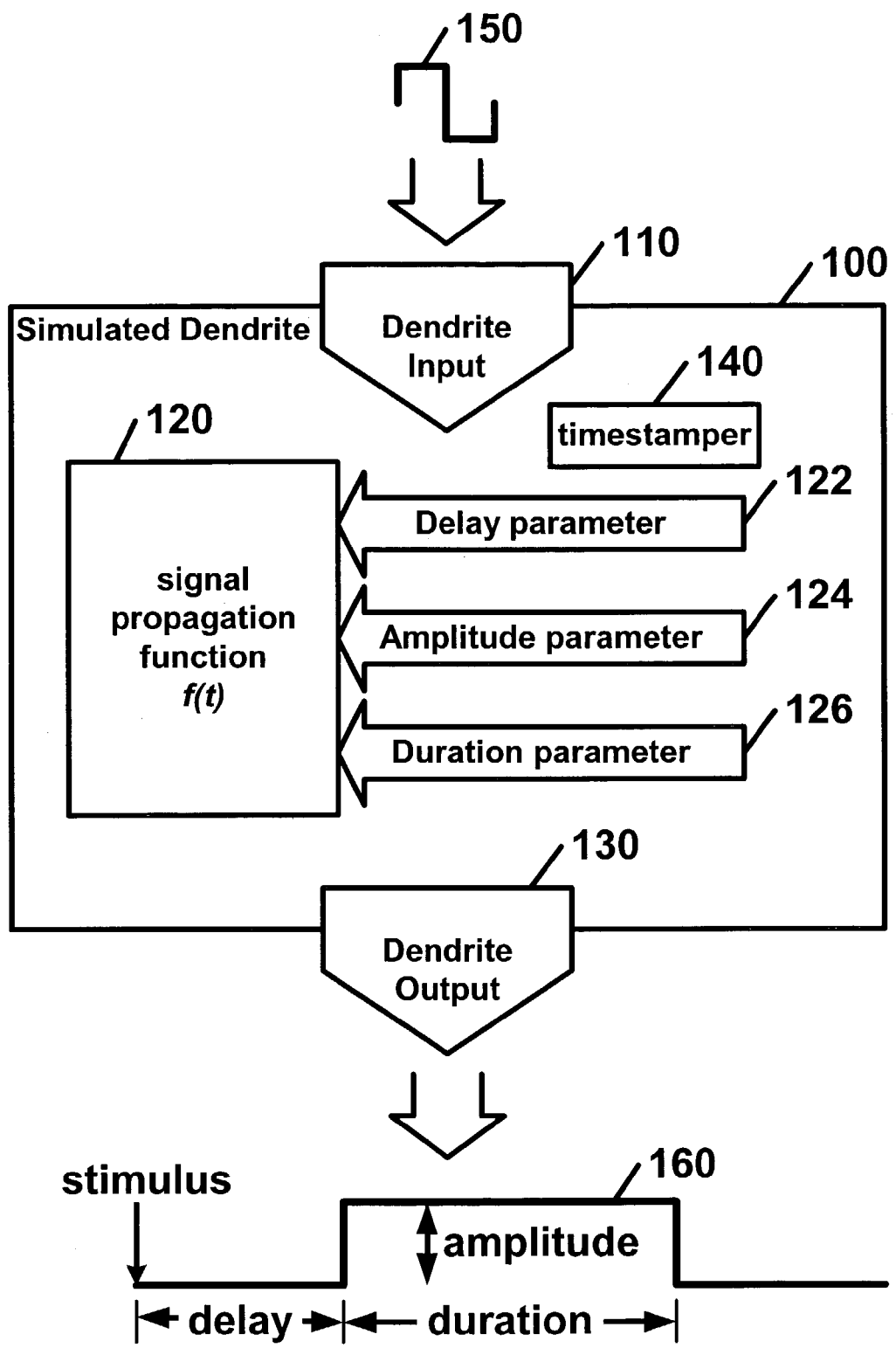
FIG. 1 shows a block diagram of a simulated dendrite as per an aspect of an embodiment of the present invention.

100 simulated dendrite
110 dendrite input
120 dendrite signal propagation function
122 a delay parameter
124 an amplitude parameter
126 a duration parameter
130 dendrite output
140 timestamper
150 dendrite input signal
160 dendrite output signal
200 simulated axon
210 axon input
220 axon function
222 summation function
224 a threshold
230 an axon output
250 an axon input signal
260 an axon output signal
300 neural processing element
310 simulated dendrite 1
312 simulated dendrite 2
314 simulated dendrite N
320 simulated axon
350 dendrite input signal 1
352 dendrite input signal 2
354 dendrite input signal N
360 simulated axon output signal
410 neural processing element L1
412 neural processing element L2
414 neural processing element LN
420 Neural processing element M1
450 neural processing element L1 input signal 1
452 neural processing element L2 input signal 2
454 neural processing element LN input signal N
460 neural processing element M1 output signal
510 stimulus 1
520 neuron
530 axon
540 dendrite
542 proximal dendrite location
544 distal dendrite location
710 proximal alpha function
720 proximal square wave
730 distal square wave
740 distal alpha function

DETAILED DESCRIPTION OF THE INVENTION

The present invention includes neural processing element(s), capable of modeling neuronal electrotonic effects, and combinations of the same connected according to a neural topology into neural network(s). Network dynamics are viewed as a spatiotemporal pattern of activity where meaningful information may be carried out by the location and time of all spikes. The present invention provides for a digital representation of neurons firing in time steps.

Activity may be mediated by synaptic contacts (i.e., possibly disregarding at this level ephaptic interactions, gap junctions, neurotransmitter spillage, etc.). Although in principle all sorts of synapses may be included, the present invention may model excitatory and inhibitory ionotropic synapses.

In "classical" artificial networks (e.g. McCulloch-Pitts, or with more complex physiology, but in the absence of neuronal morphology), the dynamical activity (or the "input/output relationship") is essentially determined by the network topology/connectivity, and by the strength of each synapse. Biological networks however have an added element of complexity, which is single-cell morphology. This may be related to the network topology and connectivity, as well as to the single-cell activity. Single-cell morphology may affect quite heavily network dynamics.

This system provides a computational approach preferably capable of determining the "structure-activity" relationship of a relatively complex neural network model on the order of real-scale brain systems (e.g., the the rat hippocampus). This is done by significantly simplifying the single-cell model while still capturing critical aspects of the neuronal structure.

FIG. 1 shows a block diagram of a simulated dendrite 100 as per an aspect of an embodiment of the present invention. The simulated dendrite 100 has a dendrite input 110 preferably capable of receiving a dendrite input signal 150. This input signal may be many types of signals such as a square wave, a sinusoid and an impulse. The received dendrite input signal 150 may be time-stamped by a timestamper 140. A dendrite signal propagation function 120 may then process the dendrite input signal 150. For the purpose of this discussion, we will call this function f(t). Many functions may be used for f(t), however, in a preferred embodiment of this invention f(t) may be:

$$f(t) = \begin{matrix} 0, & t_0 < t < t_0 + \text{delay} \\ A, & t_0 + \text{delay} < t < t_0 + \text{delay} + \text{duration} \\ 0, & t > t_0 + \text{delay} + \text{duration} \end{matrix} \quad (1)$$

where: $t_0$ may be the time the dendrite input is received, A may be defined by amplitude parameter 124, delay may be defined by delay parameter 122, and duration may be defined by duration parameter 126. The resultant dendrite output signal 160, may be output from the simulated dendrite 100 through a dendrite output 130.

Figure 2:
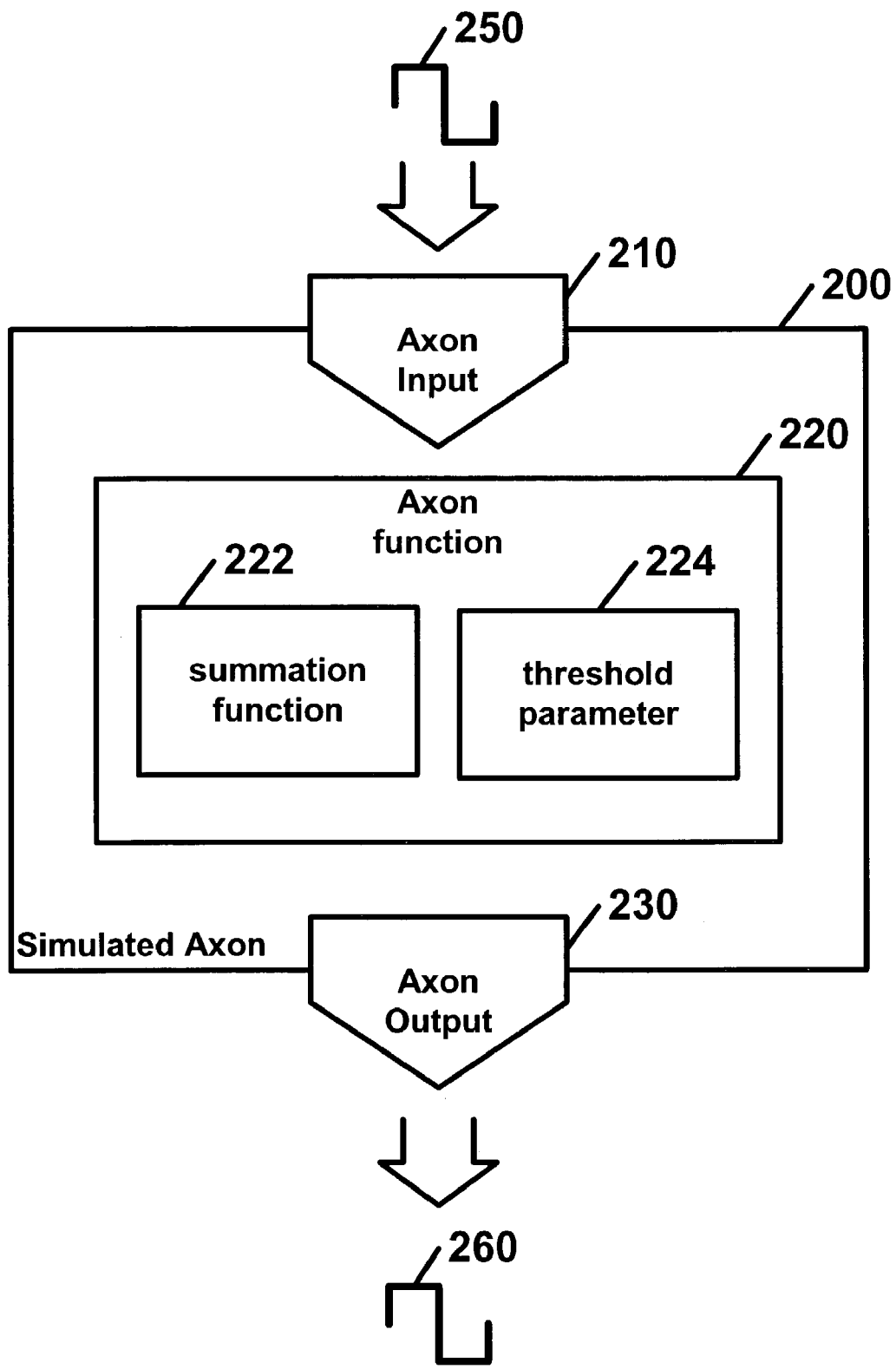
FIG. 2 shows a block diagram of a simulated axon as per an aspect of an embodiment of the present invention.

FIG. 2 shows a block diagram of a simulated axon as per an aspect of an embodiment of the present invention. The simulated axon 200 preferably has an axon input 210 capable of receiving an axon input signal 250. This axon input signal 250 may be one or more dendrite output signals 160. These received axon input signal(s) 250 may be processed by a summation function 222. When the result of the summation function 222 meets or exceeds a threshold 224, then an axon output signal 260 may be output from the simulated axon 200 through an axon output 230.

Figure 3:
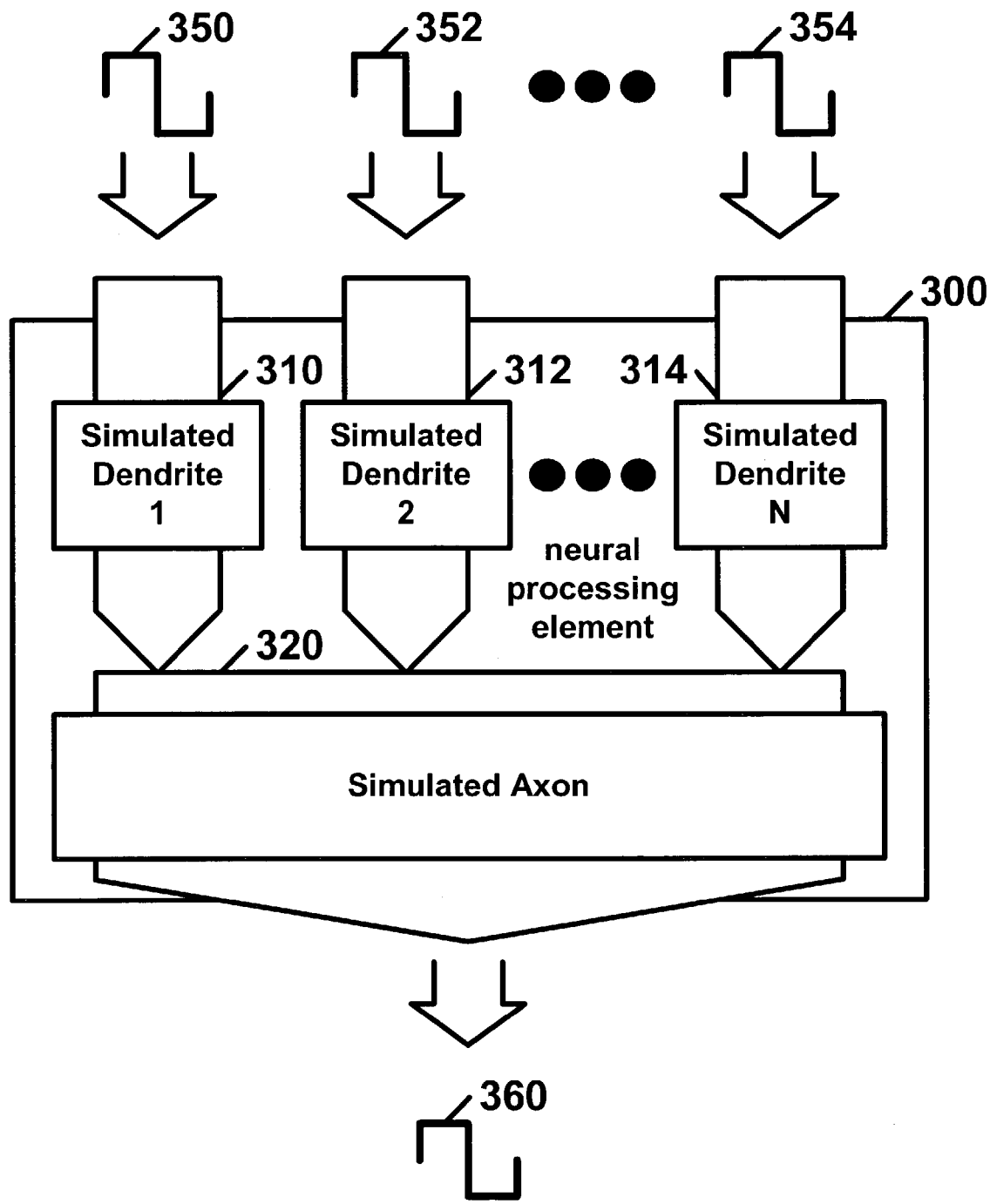
FIG. 3 shows a block diagram of a neural processing element as per an aspect of an embodiment of the present invention.

FIG. 3 shows a block diagram of a neural processing element 300 as per an aspect of an embodiment of the present invention. In a preferred embodiment of this invention, this neural processor is a simulated deterministic binary neuron that is capable of comparing the sum of active inputs at time steps to the value of a threshold. As shown, the neural processing element 300 consists of a multitude of simulated dendrites (310, 312 through 314). Although only three simulated dendrites are shown, one skilled in the art will recognize that any number of simulated dendrites may be used in constructing a neural processing element 300 as per this invention. Each of these simulated dendrites (310, 312 through 314) is preferably capable of receiving neural processing element input signal(s) (shown as 350, 352, and 354). The outputs of each simulated dendrite(s) (310, 312 through 314) preferably feeds into a simulated axon 320. The simulated axon should then generate a neural processing element output signal 360. It is possible that each of these neural processing element input signal(s) (350, 352, and 354) are neural processing element output signal(s) 360 from the other neural processing element(s) 300.

Figure 4:
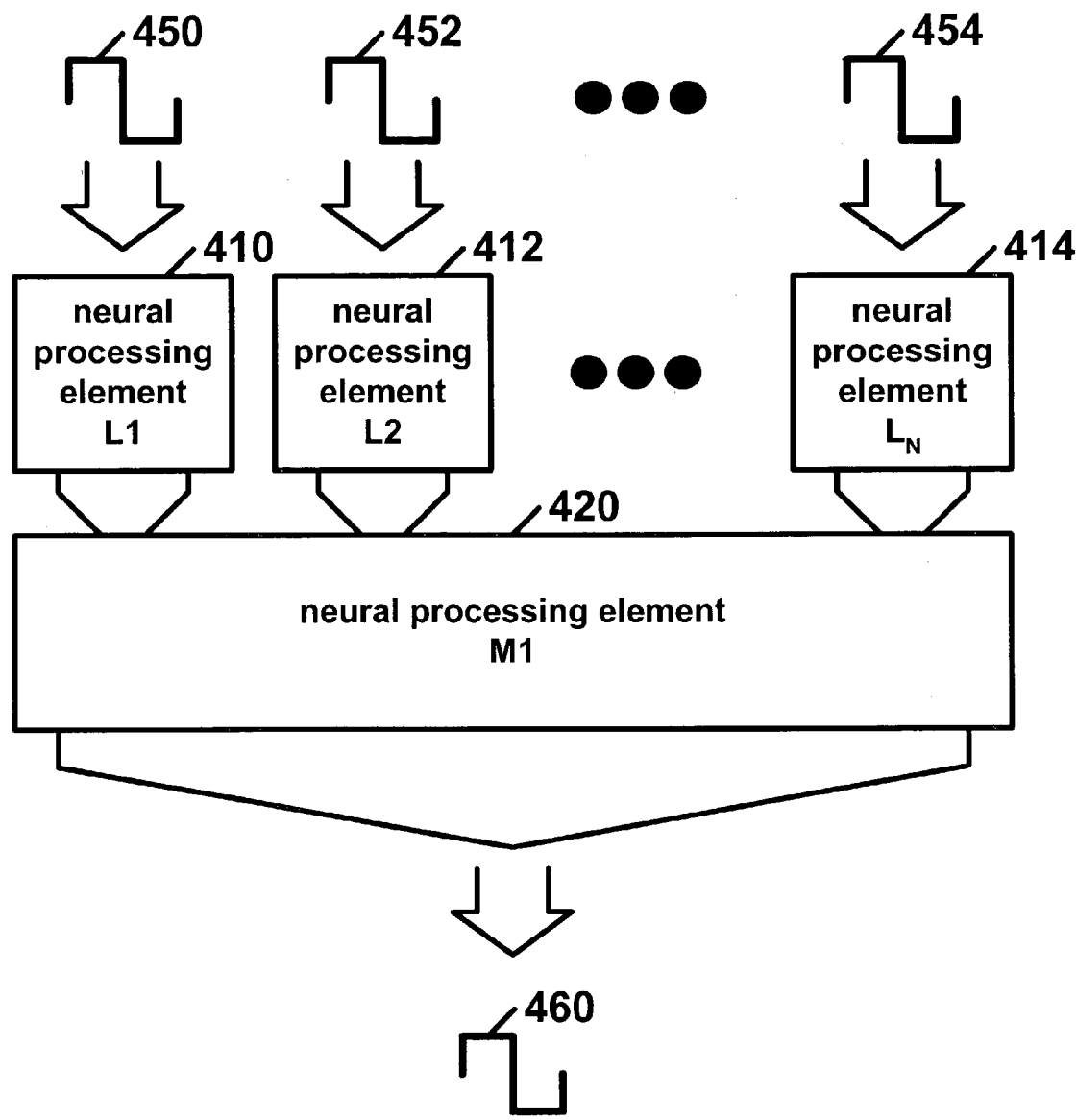
FIG. 4 shows a block diagram of interconnected neural processing elements as per an aspect of an embodiment of the present invention.

FIG. 4 shows a block diagram of interconnected neural processing elements (410, 412, 414, and 420) as per an aspect of an embodiment of the present invention. These neural processing elements (410, 412, 414, and 420) are connected in a simple two layer neural topology. This simple two layer topology was shown for illustrative purposes. One skilled in the art will recognize that realistic topologies are likely to be much larger, both in the number of neural processing elements in a layer, and the number of layers. Each of these topologies are preferably fed stimulus signals 450, 452 and 454 from either other neural processing element combinations or from other stimulus generation sources. The output of this illustrated topology is signal 460.

The preferred embodiment of this system is implemented in software. Each calculation is made during a synchronous time step.

These neural network(s) per the present invention may be based on a spike response model incorporating electrotonic effects. Preferably, if the activity sum exceeds the threshold 224, and the neural processing element 300 did not fire in the previous time step (absolute refractory period), then the neural processing element 300 preferably fires in the given time step. The basic threshold 224 value may be uniform throughout the population of the neural processing element(s) 300. However, this threshold 224 may be dynamically and instantaneously adjusted during a time step to maintain an overall network activity close to a desired level. For example, in one embodiment, this desired level was in the area of 5%.

For efficiency reasons, input values may be integers and the network limited to a finite number of neural processing elements. Since there may be no threshold value resulting in an activity of exactly the desired activity level, the threshold value may be selected to best approximate the target population activity from either direction. This dynamic threshold mechanism may be seen as representing fast feedback inhibition, and may be functionally equivalent to a "k-winners-take-all scheme" as described in "Computational explorations in cognitive neuroscience," by R. C. O'Reilly and Y. Munakata, published by MIT Press in 2000. In addition, the threshold value may be further increased for each neuron that fired two time steps before, such that its firing probability is approximately halved (relative refractory period).

In sum, a given input to a neural processing element may be active depending on the firing state of a corresponding presynaptic neural processing element. The input may be approximated as a square wave characterized by a delay, an amplitude, and a duration ("Dad" synapse). The delay may be the number of time steps from presynaptic firing to the onset of the postsynaptic signal. In a preferred embodiment, the amplitude is an integer value that is summed with all other active input amplitudes by the postsynaptic neural processing element at each time step. Finally, the duration may be the number of consecutive time steps for which the input is counted by the postsynaptic neural processing element following the onset (FIG. 1). The values of delay, amplitude, and duration preferably depend on the electrotonic distance of the synapse.

Although some important aspects of cellular physiology may be neglected, other essential aspects of brain function are not neglected such as network size and structure. From the biological point of view, this approach may help determine what aspects of network dynamics (e.g., rhythms, etc.) may arise simply from structure, independent of complex physiological features. From the artificial intelligence point of view, this approach may help discover useful, brain-inspired computational principles.

In this invention, time may be divided in discretized steps, and in each step, a neuron may be either spiking or not. A possibly convenient choice of time step could be the duration of a spike (~1 ms). After a neuron spikes, it may go into a refractory period, in which it cannot spike. In other words, during the refractory period, the input to the neuron may basically be disregarded. If the maximum firing frequency is somewhere near 500 Hz, a refractory period of 1 ms could be reasonable.

When a neuron spikes, it may activate all synaptic contact made by its axon. As a first working approximation, the signal may be modeled as propagating without failure, but failure probability may easily be added. Given a value of conduction velocity (which may depend on the type of axon, and myelination), the timing of each synaptic activation may be derived from the distance along the axonal path from the presynaptic neuron and the synapse.

The process of dendritic integration is at the core of the novel approach disclosed by this invention. The present invention abstracts what is known about dendritic outputs, or PSPs (from cable theory, electrophysiological experiments, and compartmental models) in a simple "McCulloch-Pitts style" format. From cable theory and experimental evidence, it is known that proximal and distal dendrite input(s) may produce different dendrite outputs:

| dendrite input(s): | proximal | distal |
| --- | --- | --- |
| Delay: | short | long |
| Duration: | short | long |
| Peak ampl.: | large | small |

The result on the total integral of voltage over time in the soma may be such that proximal dendrite inputs cause "only" about twice as much depolarization as distal dendrite inputs. Initial calculations indicate that the delay may be approximately ⅓ of the duration. For reasonable electrotonic lengths, typical proximal/distal delays may be around 0.5–2.5 ms (adding a 0.5 ms fixed synaptic delay due to diffusion, vesicle dynamics etc., it may be possible to keep 1 ms as the basic time step, making the "total" delay 1–3 ms). These may correspond to durations of ~2–8 ms.

The idea here is to approximate the EPSPs with discretized "square waves" characterized by three parameters: a delay 'δ', a duration 'D', and an amplitude 'A'.

The basic idea is that the neuronal summation of the synaptic inputs may be strongly mediated by the electrotonic distance of the contact: synapses close to the soma arrive quickly, have a large weight (i.e., they can contribute heavily to the threshold-cutoff decision of firing/nonfiring), but get counted for a short time. In contrast, synapses further away of the dendritic tree may arrive slightly later, have a smaller weight in the instantaneous input/output decision, but get counted for a considerably longer time window.

Considering that different neuronal pathways contact dendrites in different layers (e.g., in rat hippocampus CA3 pyramidal cells, perforant pathway, Schaffer's collateral, and mossy fibers), this differential integration property may well affect network dynamics. It is possible (and intriguing) that this activation paradigm captures a fundamental aspect of neuronal integration, while keeping the computational intensity level much closer to McCulloch-Pitts neurons than to models based on the numerical solution of differential equations.

The key parameters, δ, D, and A for a given morphology and neuronal class may be derived in any number of ways. A guiding factor should be any available experimental knowledge (published in the scientific literature). Additionally, at the level of single neuron simulations, empirical information may be obtained with detailed compartmental models (e.g. based on Hodgkin-Huxley equations). Note that since δ, D, and A may be coarsely discretized, only a first approximation of the estimate may be attempted.

Possibly, slightly different rules could be useful to describe axosomatic and axoaxonic contacts. Metabotropic synapses and neuromodulators (e.g. ACh, etc.) could be added as well.

This scheme so far has assumed a weighted but linear summation of instantaneous dendrite output contributions to the axon. It is possible that non-linear interactions may also be included. Compartmental models may be used to find rules. A possible cost may be an increase in simulation complexity.

An additional important point may be the "size" of the original dendrite input. Dendrite inputs may or may not be the same throughout the dendritic tree. This may likely remain a "discretionary" parameter in the model (although constrained in a plausible biological range). In fact, the model could be used to investigate the potential functional effects of different hypotheses in this regard. Here, the "size" of the dendrite input may be simply modeled as an additional multiplicative parameter in the amplitude A.

Finally, the same parameter of dendrite input weights may be exploited for studies of plasticity, much the same way learning rules are explored in the artificial neural network community.

Figure 5:
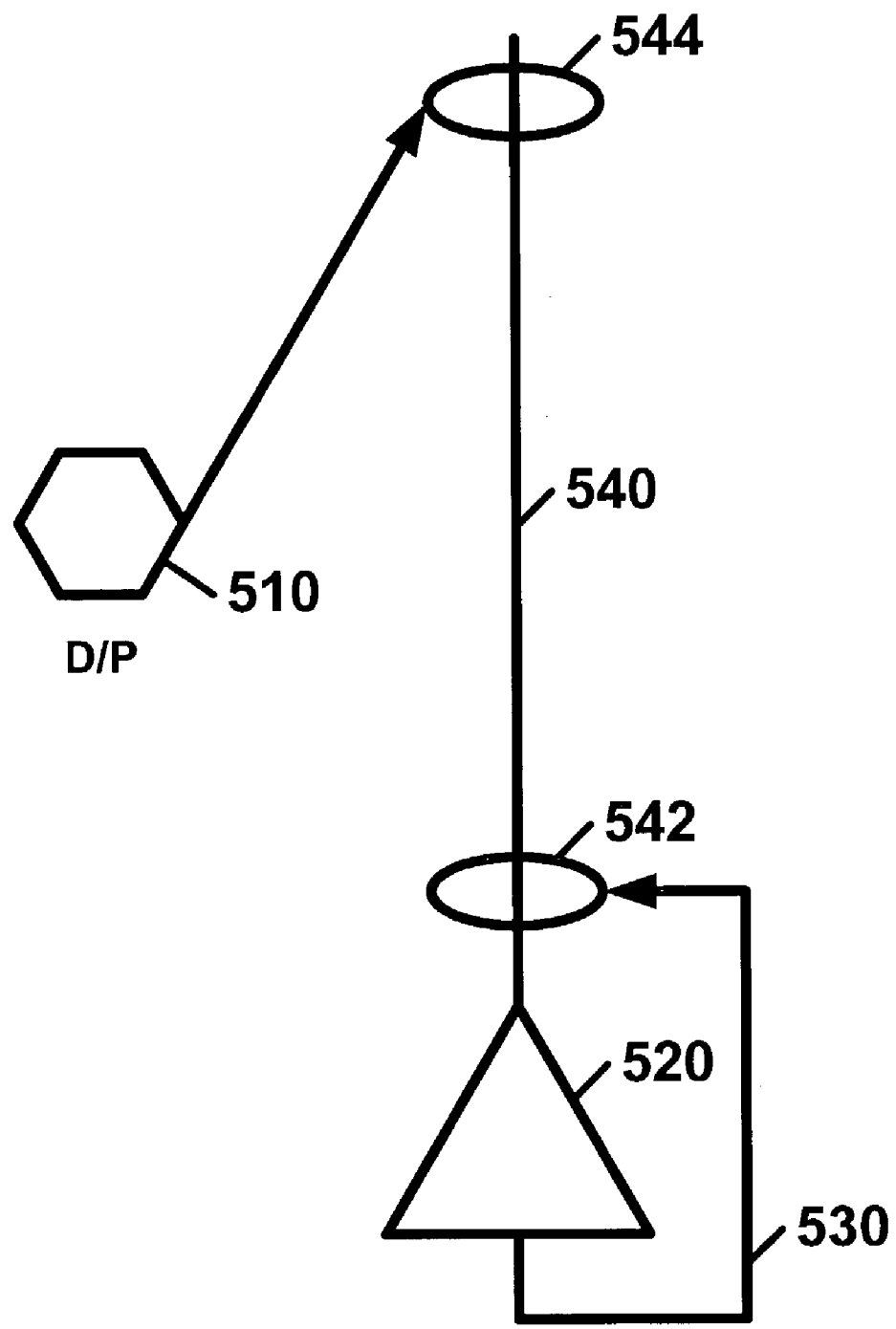
FIG. 5 shows a D/P distal feedforward, proximal recurrent network configuration as per an aspect of an embodiment of the present invention.
Figure 6:
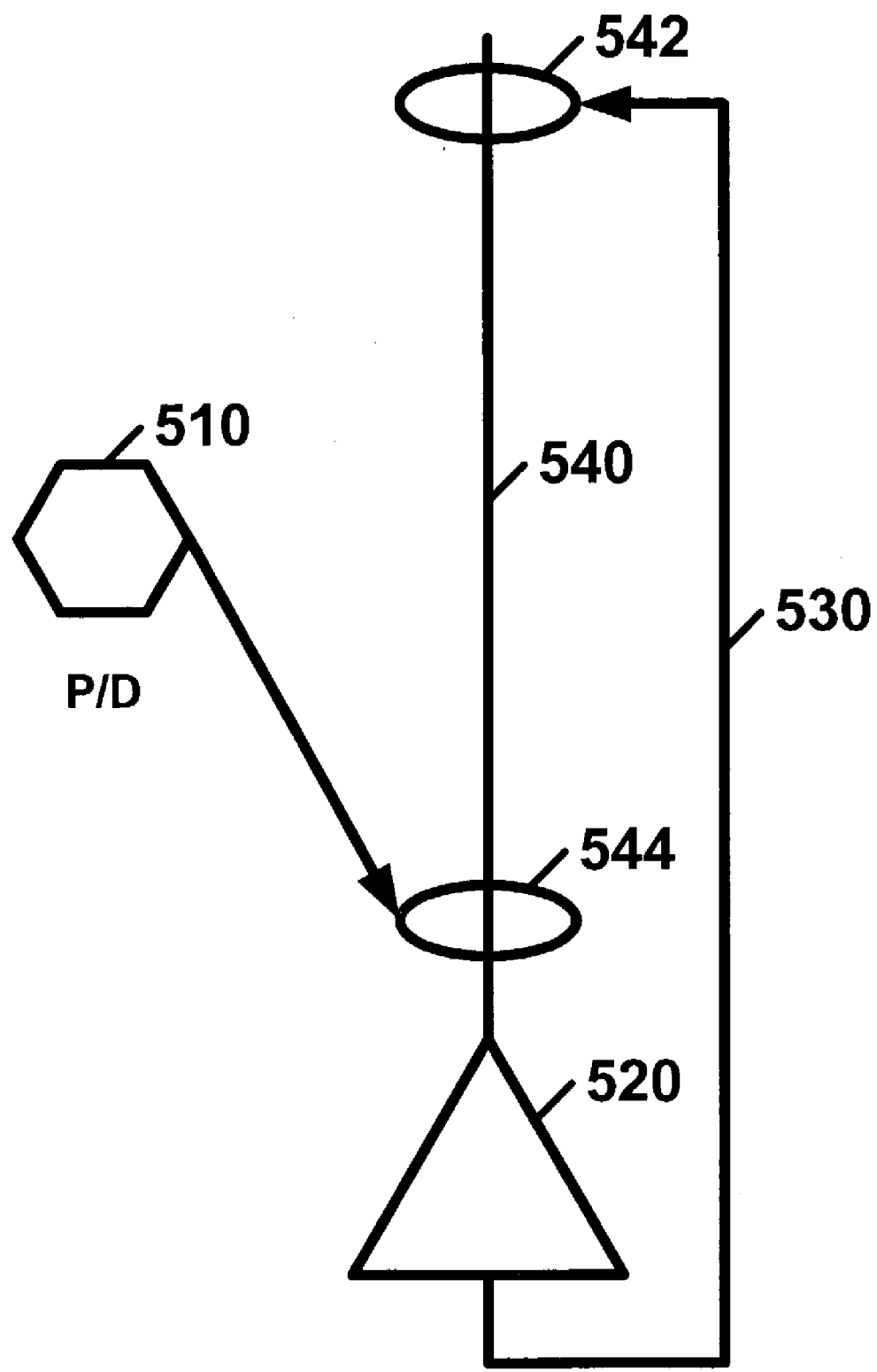
FIG. 6 shows a P/D proximal feedforward, distal recurrent network configuration as per an aspect of an embodiment of the present invention.
Figure 7:
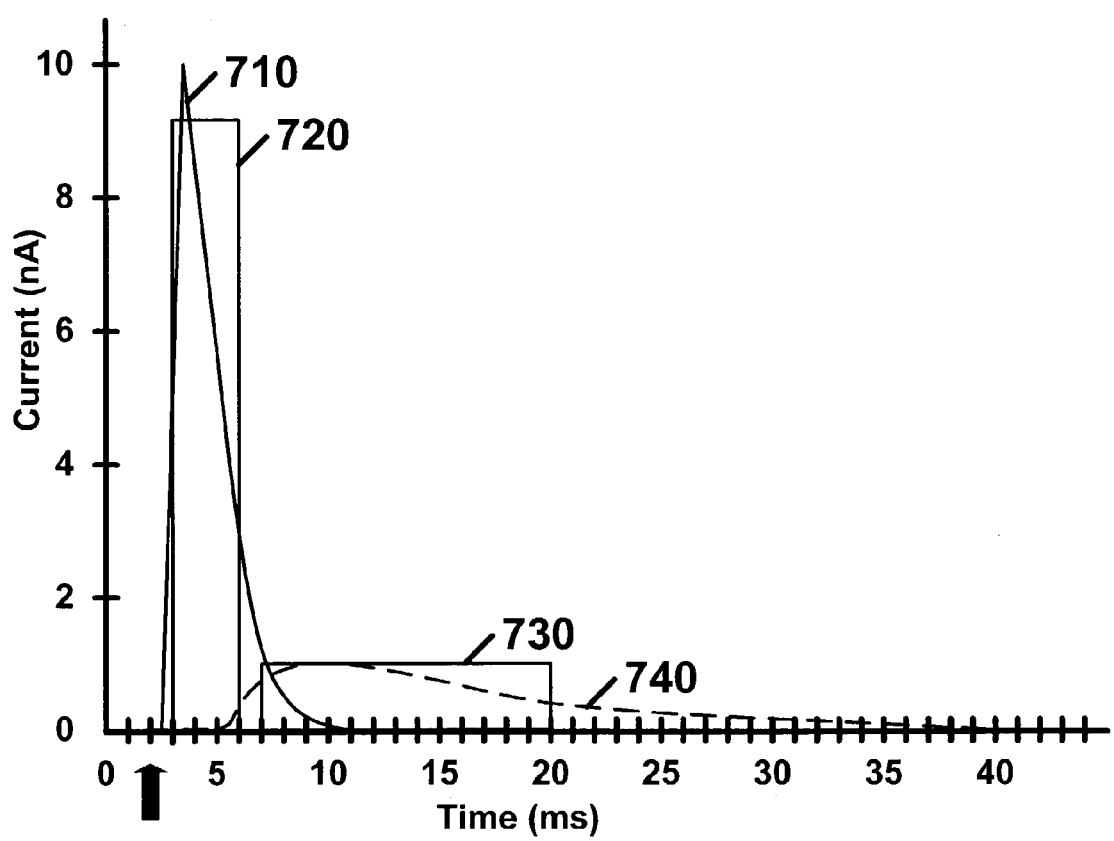
FIG. 7 is an illustrative plot of typical synaptic currents approximated by traditional alpha functions and by the square waves corresponding to the parameters (delay, amplitude, and duration) of the present invention.

FIG. 7 shows examples of typical synaptic currents approximated by alpha functions (proximal 710; distal 740) and corresponding Dad square waves (proximal 720; distal 730). Both current and time scales are for illustration only, and do not necessarily correspond to values used in simulation. FIG. 5 shows an example of a D/P: distal feedforward, proximal recurrent network configuration and FIG. 6 shows a P/D: proximal feedforward, distal recurrent network configuration.

Example

The following describes one embodiment as an example. This example is provided for illustrative purposes to show one way in which the invention may be used. This example is not intended to limit the invention in any way. Software scripts written in Matlab (available from The MathWorks in Natick, Mass.) are included in Appendix A. These scripts may be used in part by one skilled in the art to implement a version of this embodiment. This example embodiment may be run on a personal computer such as a 500 MHz Pentium III with 256 MB of RAM, using Matlab running under a Microsoft Windows operating system such as Windows 98.

In the description of this example embodiment, the term neuron is used to represent a neural processing element. In this embodiment, proximal synapses were given a delay of 1 time step, an amplitude of 4, and a duration of 1 time step. Distal synapses were given a delay of 2 time steps, an amplitude of 1, and a duration of 4 time steps. The network consists of a set of 1000 inputs projecting to a layer of 1000 neurons with random, sparse (10%) connectivity (feedforward pathway). The neuron (output) layer also projects to itself with random and sparse (10%) connectivity (recurrent pathway). Feedforward (input to output) and recurrent (output to output) synapses are independently set as proximal or distal, modeling dendritic connections near or far from the soma, respectively. Thus, four architectures are possible: proximal/proximal, proximal/distal PD, distal/proximal DP, and distal/distal (with the two attributes referring to feedforward and recurrent synapses, respectively). Two examples are schematized in the inset of FIG. 2.

Firing patterns may be set in the set of inputs, and recorded from the neuron layer, for 500 time steps. Six different stimulation patterns are used for the set of inputs, resulting from three firing modes (random, spiking, and bursting), either synchronously or asynchronously. Random firing is aperiodic; spiking is a periodic pattern of one spike followed by 19 silent time steps; and bursting is a periodic pattern of a train of 4 spikes with inter-spike interval of 2 time steps, followed by 70 silent time steps. In synchronous patterns all inputs fire in phase, while in asynchronous patterns the phase of each input is assigned randomly. Thus, in synchronous firing the input activity is sparse (5%) over the whole simulation period, but not at each time step. In contrast, the activity of the neuron layer is maintained as close as possible to 5% at each time step by the dynamic threshold. The dynamics of the neuron layer are mainly characterized here with two parameters: concentration and irregularity. Concentration is a measure of the distribution of network activity among all neurons. For example, given an average network activity of 5%, a high concentration would correspond to 10% of the neurons being active 50% of time steps (with the remaining neurons always silent), while a low concentration would correspond to each and every neuron being active 5% of time steps. Irregularity is a measure of the even separation of spikes in the activity raster. In general, random firing corresponds to high irregularity, while bursting and especially spiking modes correspond to low irregularity. The exact formulae of concentration and irregularity are defined in equations 1 and 2, respectively.

$$\text{Concentration} = \sigma_n[\mu_T(F_i)]/\mu_N[\mu_T(F_i)] \quad (1)$$

$$\text{Irregularity} = \mu_N[\sigma_T(ISI_i)*\mu_T(F_i)]/\mu_N[\mu_T(F_i)] \quad (2)$$

where $F_i$ and $ISI_i$ are the set $\mu_T$ of firing states (0/1 for silent/firing) and interspike intervals for the ith neuron, respectively; $\mu_T$ and $\mu_N$ are the means taken over time and over the set of neurons, respectively; and $\sigma_T$ and $\sigma_N$ are the standard deviations taken over time and over the set of neurons, respectively. Thus $\mu_T(F_i)$ is the mean firing rate of the ith neuron, and concentration corresponds to the coefficient of variation of this quantity over the set of neurons.

Results from simulations run using the example embodiment of the invention will now be discussed. This discussion is not intended to limit the scope of this invention in any way. These results are presented for their instructive content, to indicate the type of results one practicing this invention may achieve and to enhance the understanding of one skilled in the art to understand one of the multitude of ways that this invention may be utilized. A total of 48 simulations were run, two for each combination of stimulus pattern in the set of inputs (synchronous and asynchronous random, spiking, and bursting) and connectivity pattern in the neuron layer (feedforward and recurrent connections corresponding to proximal or distal synapses). The firing state of each neuron, as well as the value of the dynamic threshold, were recorded at each time step. All parameters of equations 1 and 2 were computed from these data. The visualization of the complete raster plots for each of the 24 pairs of repeated simulations showed several emerging trends, all systematically confirmed by both non-identical runs of every pair. First, rasters corresponding to distal synapses in the recurrent connections (independent of the electrotonic distance of feedforward synapses) systematically displayed a more apparent spatial pattern of spikes. While neuronal activity in networks with proximal recurrent synapses was centered at the mean of 5%, with a maximum rate of ~15%, in networks with distal recurrent synapses most neurons were almost entirely silent, but cells that did fire could reach an activity of >30%.

This feature is quantitatively captured by the concentration parameter, and is summarized for all simulations in FIG. 8. Note that the concentration ratio between the proximal/distal and distal/proximal connectivity patterns (pd/dp) for each of the firing modes (random, spiking, and bursting) is greater when the input stimulus is synchronous.

A closer inspection to the firing patterns of individual neurons revealed additional effects. In particular, certain simulations may result in more regular temporal patterns of firing than others. The P/D configurations may tend to generate traces typical of regular spikers, while the D/P configuration may tend to generate more random patterns. This feature is again summarized in tabular format for all simulations using the irregularity parameter in FIG. 9. If the stimulus from the set of inputs is random and/or synchronous, there is likely to be no electrotonic effect on the irregularity in the neuron layer. In contrast, if the input stimulus is regular (spiking or bursting) and asynchronous, then the network activity is more likely to be regular when recurrent synapses are electrotonically more distant than feedforward synapses, and less regular in the opposite configuration. Interestingly, the irregularity of the output is intermediate if recurrent and feedforward synapses have the same electrotonic distance (both proximal or both distal). It is important to add that the concentration and irregularity parameters are uncorrelated across the simulations ($R^2 = 0.0616$).

Although the dynamic threshold mechanism controls the mean firing rate, one practicing the present invention may note that the network activity fluctuates depending on the number of neurons which are similarly close to the firing threshold. No electrotonic effects should be observed on the activity fluctuations in response to synchronous stimuli. However, in response to asynchronous stimuli, overall network activity layer should appear more constrained (with lower amplitude fluctuations around the mean firing rate) if feedforward and recurrent synapses were electrotonically distant from each other, in either configuration (i.e., proximal/distal or distal/proximal, but not proximal/proximal or distal/distal).

The temporal pattern of the threshold value in the neuron layer ("inhibition") may closely reflect the stimulus pattern in the set of inputs. In the case of synchronous bursting stimulation with distal (but not proximal) feed-forward projections, the inhibition traces may partially integrate the high-frequency component of the bursts into square waves.

A spike response embodiment may be employed by approximating synaptic inputs with square waves characterized by three parameters: delay, amplitude, and duration. The electrotonic properties of the relative synaptic positions in a simple feedforward/recurrent network may be captured by adopting shorter delay and duration and higher amplitude for proximal than for distal synapses. Network dynamics using this embodiment displays a wide range of firing concentration, irregularity, and fluctuation around the mean value. This variable behavior appeared to be due to the specific combination of stimulus pattern and electrotonic architecture of the network. In particular, recurrent distal synapses tended to concentrate network activity in fewer neurons, while proximal recurrent synapses resulted in a more homogeneously distributed activity, especially in the presence of synchronous feedforward input. In response to asynchronous spiking or bursting, network activity was regular with recurrent synapses more distal than feedforward ones, and irregular in the opposite configuration. Network fluctuations in response to asynchronous input were dampened when feedforward and recurrent synapses contacted the dendrites in opposite electrotonic positions.

What are the mechanisms underlying these results? Distal connections have a longer-lasting effect on neuronal activity. This can provide an explanation for the concentration of network activity in fewer neuron in architectures with distal recurrent synapses. In this configuration (and with random but fixed connectivity), firing of one neuron is a predictor of further firing of the same neuron within a period corresponding to the input duration of recurrent synapses. This explanation was supported by additional simulations with simpler recurrent networks (not shown), in which the effect of electrotonic distance on firing concentration faded completely when the absolute refractory period was extended to match the duration of synaptic input. The peculiar combination of feedforward stimulus pattern and electrotonic configuration controlling irregularity and fluctuation of network activity, in contrast, defies simple explanations.

The firing (spike) duration, as well as the duration of the absolute and relative refractory periods, were all set to one time step in this model. Based on typical Hodgkin-Huxley parameters for central nervous system neurons, one could draw a rough correspondence between one simulation time step and 1 ms of biological time. This would result in the equivalence of the chosen activity level (5%) to a mean firing frequency of 50 Hz. In this scale, the parameters selected here for synaptic delay and duration correspond, according to cable theory, to electrotonic distances from the soma of approximately 1 and 5 length constants for proximal and distal connections, respectively. The relatively sparse connectivity of both feedforward and recurrent pathways is also within a biologically plausible range. Each neuron receives an average of 10 proximal inputs or 40 distal inputs (or a combination of the two) every ms. The sparse activity and connectivity typically observed in biological neural networks constitute a difficult challenge for reduced scale models.

The electrotonic effects on the dynamics of networks with more complex synaptic architectures remain to be explored. Even the simple two-layer network architecture examined here, however, is of potential biological relevance. This model can be viewed as an extreme simplification of the CA3 region of the hippocampus. When the dentate gyrus provides the predominant input to CA3, the recurrent CA3 collaterals are distal relative to the feedforward (mossy fibers) stimulus. Conversely, when the entorhinal cortex constitutes the primary input to CA3, the recurrent CA3 collaterals are proximal relative to the feedforward (perforant path) stimulus.

Parameters may be set to represent the electrotonic influences on network dynamics that could apply to several other synaptic architectures. For example, the Dad parameters may be selected to model specific active conductances and passive integration of synaptic signals of various neuronal classes.

The basic elements of this invention are the neural processing units. Although the detailed geometry may be necessary to establish network connectivity and synaptic properties, once a network is "wired up" (offline), additional anatomical information may not need to be accessed. Once a simulation is run, resulting activity could be "reloaded" on the structure for intuition-fostering visualization. Note however, that separating activity and connectivity may neglect the influence of activity on connectivity. This influence, however, appears to occur at a longer time scale that the dynamical scale considered here—i.e., seconds).

The spike response model with "Dad" synapses disclosed herein provides a formalism almost as simple as McCulloch-Pitts', while allowing the electrotonic representation of layered synaptic architectures. One skilled in the art will recognize that because of recent advances in computational neuroanatomy, this model may be used to generate anatomically realistic neural network models of relatively large regions of the brain. This Dad approximation may be used to model real-scale simulations of biological networks.

For each synapse, the identity of the presynaptic and postsynaptic neuron, the delay from the presynaptic neuron, and the electrotonic distance from the postsynaptic neuron (determining $\delta$, D, and A) may need to be stored. This may require 10 or more bytes of information in the currently preferred embodiment.

For example, a rat hippocampus has approximately 2 million cells. The average number of synapses is around 10,000 per cell. A mouse dentate gyrus has approximately ¼ of the cells of the rat. Assuming that the number of connections scale with the square roots of the number of cells, one would expect 500k cells and 5000 synapse/cell for the mouse. Pushing the limit to a "very small rodent", it is possible to consider a hippocampus with 20,000 neurons and 1000 synapses per neuron. This would correspond to a reduction factor of 100 (cells) and 10 (synapses) from the rat. The model would still have the physiological equivalent of 20 million compartments. This 20k neuron hippocampus would take approximately 200 MB of space, and could thus fit in a standard PC RAM!

Simulations using this invention may be performed in a relatively short period of time. At each time step (1 ms), the state of all neurons (firing/nonfiring) needs to be updated. For each neuron, the sum of the instantaneous contributions of all active synapses may be needed. If the average firing frequency of the hippocampus is ~10 Hz, and the average EPSP duration is ~5 ms, on average only 50 synapses will be active in each time step. This amounts to 50 sum operations times 20,000 neurons (1 million). Next, for the neurons that are indeed firing, all synaptic activities may be updated, for the duration of all time steps of each synapse. This amounts to approximately 1000*5 write operations, times 200 neurons (another 1 M). Considering a 200 MHz processor (to roughly match the 200 MB RAM), and approximately 100 clock ticks per operations, it would only take approximately 1 second to simulate 1 ms of network activity. In 1 hr simulation time, it might be possible to get 3.6 s of dynamics. An overnight (15 hrs) simulation might yield almost a minute of network activity.

The present invention may be scaled as computational power increases. Quadrupling the number of neurons (80k neurons instead of 20k) would need to double the number of synapses, thus causing an 8-fold increase in RAM space (and corresponding clock time). This could be feasible already with present-day computers (1.6 GB RAM, 1.6 GHz . . . ). If computational power doubles every 18 months, in 30 years, with this neural network paradigm, it would be possible to simulate a network $(2^{20})^{2/3}$ bigger than today's size. This corresponds to approximately 10,000×100,000=1 billion neurons (and 200k synapses per neuron . . . the allometry doesn't fit anymore, but the size is basically close to real brains). With the ever increasing rate of computational power, it may be possible to model a complete rat hippocampus in less than 10 years. Of course, one skilled in the art will recognize that the present invention may be configured to run in a parallel structure to achieve large scales much sooner.

The present invention may have a multitude of uses. For example, complex questions could be addressed such as: how does the network dynamic change if neurons are inhibited? Or give correlated activity? In addition, issues could be addressed such as: what happens to the network dynamics if a hippocampus is sliced coronally? saggitally? Along its own longitudinal axis? What happens if parameters of excitability are changed (e.g. threshold, or amplitude), by changing the bathing conditions? How about the kinetics (e.g. delay, duration), by changing the temperature? What happens to the network dynamics with "targeted" neurogenesis in the DG? What extracellular field could result from the spike pattern (here again the relationship could be established with detailed compartmental models at the single cell level, and then integrated here at the network level).

The foregoing descriptions of the preferred embodiments of the present invention have been presented for purposes of illustration and description. They are not intended to be exhaustive or to limit the invention to the precise forms disclosed, and obviously many modifications and variations are possible in light of the above teaching. The illustrated embodiments were chosen and described in order to best explain the principles of the invention and its practical application to thereby enable others skilled in the art to best utilize the invention in various embodiments and with various modifications as are suited to the particular use contemplated. For example, one skilled in the art will recognize that the present invention may be used for signal processing. Similarly, the present invention may be used in the study of neural activity.

Appendix A

```matlab
% Matlab
% Example Dendritic network
% Two-layer excitatory net
% input set, output recorded
% Feedforward input-output
% and recurrent output-output
% random/sparse connections
% firing normalization
% To bound firing rate
% dad13m.m
% From Dad12m
% Corrected; overnight sims % % % % % % % %
% Output data %
% % % % % % % % ini_time=cputime;

F=zeros(1000, 500, 4, 6, 2); % (rows, columns, dad switch,
stimulus switch, repetition)
I=zeros(500, 4, 6, 2); % (columns, dad switch, stimulus switch,
repetition)
S=zeros(1000, 500, 4, 6, 2); % (rows, columns, dad switch,
stimulus switch, repetition)

% % %

T_steps=520;

% % % % % % % % % % % % % % % % % % % % % % % % % % %
% Neuron numbers, thresholds, synapses, and stimulation %
% % % % % % % % % % % % % % % % % % % % % % % % % % %

N_in=1000; %input neurons
N_out=1000; % output neurons
Th=80*ones(1, T_steps); % threshold (amplitude is 4!)
S_in=100; %Each input neuron contacts 100 output neurons
S_out=100; % Each output neurons contacts 100 output neurons
(self connections are allowed)
in_rate=0.05; % average input firing rate
out_rate=0.05; % target average output firing rate
```

```
%%%%%%%%
% Main Cycles %
%%%%%%%% for Dad_switch=1:4 % 1 for all McP, 2 for McP feedforward and Dad
recurrent, 3 for Dad feedforward and McP recurrent, 4 for all Dad for Stim_switch=1:6 % 1 async random, 2 sync random, 3 async
spiking, 4 sync spiking, 5 async bursting, 6 sync bursting...

for repetition=1:2 % two repeats each

%%%%%%%%%%%%
% Dendritic parameters %
%%%%%%%%%%%% if Dad_switch==1
    del_in=1;
    amp_in=4;
    dur_in=1;
    del_out=1;
    amp_out=4;
    dur_out=1;
elseif Dad_switch==2
    del_in=1;
    amp_in=4;
    dur_in=1;
    del_out=2;
    amp_out=1;
    dur_out=4;
elseif Dad_switch==3
    del_in=2;
    amp_in=1;
    dur_in=4;
    del_out=1;
    amp_out=4;
    dur_out=1;
else
    del_in=2;
    amp_in=1;
    dur_in=4;
    del_out=2;
    amp_out=1;
    dur_out=4;
end
```

```
T_init=max(del_in, del_out)+max(dur_in, dur_out)+1;

%%%%%%%%%%%%%%%%%%
% Connectivity & Initialization %
%%%%%%%%%%%%%%%%%%

C_in = fix(rand(N_out, N_in)+ (S_in/N_in));
C_out = fix(rand(N_out, N_out)+(S_out/N_out));

%Firing functions%

F_out = zeros (N_out, T_steps+T_init);
A = zeros(N_out, T_steps+T_init);

if Stim_switch==1 % asynchronous random
    F_in = fix(rand(N_in, T_steps)+(in_rate/(1-in_rate))); % *
See below*
    for n=1:N_in
        for t=2:T_steps
            if F_in(n, t)==1
                if F_in(n, t-1)==1
                    F_in(n, t)=0; % correction to avoid
consecutive spikes (*see also above*)
                end
            end
        end
    end
elseif Stim_switch==2 % synchronous random * see below *
    F_in = zeros (N_in, T_steps);
    for t=1:T_steps
        F_in(:, t)=fix(rand+(in_rate/(1-in_rate)))*ones(N_in, 1);
        if F_in(1, t)==1
            if F_in(1, t-1)==1
                F_in(:, t)=0; % correction to avoid consecutive
spikes (*see also above*)
            end
        end
    end
elseif Stim_switch==3 % asynchronous spiking
    F_in = zeros (N_in, T_steps);
    for period=1:1/in_rate:T_steps
        for frac = 0:1/in_rate-1

F_in(1+frac*in_rate*N_in:N_in*in_rate+frac*in_rate*N_in,
period+frac)=1;
        end
    end
```

```
elseif Stim_switch==4 % synchronous spiking
    F_in = zeros (N_in, T_steps);
    for period=1:1/in_rate:T_steps
        F_in(:, period)=1;
    end
elseif Stim_switch==5 % asynchronous bursting (13 bursts of 4
spikes, with interspike interval of 2)
    F_in = zeros (N_in, T_steps);
    for n=1:N_in
        phase=1+fix(40*rand);
        for period=0:12 % 13 bursts
            for spike=0:3 % 4 spikes
                theta=1+mod(phase+period*40+spike*3, T_steps); %
random "cylindrical" phase?!
                F_in(n, theta)=1;
            end
        end
    end
else % synchronous bursting
    F_in = zeros (N_in, T_steps);
    for period=0:12 % 13 bursts
        for spike=0:3 % 4 spikes
            F_in(:, 1+period*40+spike*3)=1;
        end
    end
end for t=1:T_steps
    for i=t+del_in:t+del_in+dur_in-1
        A(:, i)=A(:, i) + C_in'*F_in(:, t)*amp_in;
    end
end

% % % % % %
% R U N ! %
% % % % % % for t=8:T_steps

%    if sum(fix(((A(:, t)+abs(A(:, t)))/4)./Th(t)))>0
%        sum(fix(((A(:, t)+abs(A(:, t)))/4)./Th(t))), ' activity
over double threshold at time ', t
%    end Th_P=Th(t); % "positive" threshold
    Th_N=Th(t); % "negative" threshold
```

```
        if sum(fix(((A(:, t)+abs(A(:, t)))/2)./Th_P))>N_out*out_rate
            while sum(fix(((A(:, t)+abs(A(:,
t)))/2)./Th_P))>N_out*out_rate
                Th_P=Th_P+1;
            end
            if (N_out*out_rate - sum(fix(((A(:, t)+abs(A(:,
t)))/2)./Th_P))) < (sum(fix(((A(:, t)+abs(A(:, t)))/2)./(Th_P-
1))) - N_out*out_rate)
                Th(t)=Th_P;
            else
                Th(t)=Th_P-1;
            end else
            if sum(fix(((A(:, t)+abs(A(:,
t)))/2)./Th_N))<N_out*out_rate
                while sum(fix(((A(:, t)+abs(A(:,
t)))/2)./Th_N))<N_out*out_rate
                    Th_N=Th_N-1;
                end
                if (sum(fix(((A(:, t)+abs(A(:, t)))/2)./Th_N)) -
N_out*out_rate) > (N_out*out_rate - sum(fix(((A(:, t)+abs(A(:,
t)))/2)./(Th_N+1))))
                    Th(t)=Th_N+1;
                else
                    Th(t)=Th_N;
                end
            end
        end for n=1:N_out
            if A(n, t) >= Th(t)
                F_out(n, t) = 1;
                A(n, t+1) = -N_in;  % absolute refractory period
                A(n, t+2) = A(n, t+2)-0.07*Th(t);  % relative
refractory period (should reduce probability by about 50%...)
            end
        end for i=t+del_out:t+del_out+dur_out-1
            A(:, i)= A(:, i) + (C_out'*F_out(:, t)*amp_out);
        end
end F(:, :, Dad_switch, Stim_switch, repetition)=F_out(:, 21:520);
I(:, Dad_switch, Stim_switch, repetition)=Th(21:520);
S(:, :, Dad_switch, Stim_switch, repetition)=F_in(:, 21:520);
```

```
complete={'Dad_switch =' Dad_switch 'Stim_switch =' Stim_switch
'repetition =' repetition 'elapsed =' cputime-ini_time} end
end
end

% mean(mean(F))
% image(F*64);
% figure;
% image(A);
% stop
```

What is claimed is:

1. A digital neural processor comprising at least one neural processing element, said neural processing element including:
   a. at least one simulated dendrite, each of said simulated dendrites including:
      i. a dendrite input capable of receiving at least one dendrite input signal;
      ii. a dendrite signal propagation function for calculating a square pulse dendrite output signal in discrete time steps from each dendrite input signal, said square pulse dendrite output signal defined by:
         1. a delay parameter;
         2. a duration parameter; and
         3. an amplitude parameter; and
   b. a simulated axon including:
      i. an axon input capable of receiving each said square pulse dendrite output signal from said at least one simulated dendrite;
      ii. an axon function, capable of calculating an axon output signal from at least one square pulse dendrite output signal and from at least one previous axon output signals; and
      iii. an axon output capable of outputting said axon output signal.

2. A neural processor according to claim 1, wherein each of said at least one dendrite input further includes a timestamp.

3. A neural processor according to claim 1, wherein said delay parameter is represented by a relative timestamp.

4. A neural processor according to claim 3, wherein said timestamp is an integer timestamp.

5. A neural processor according to claim 1, wherein said amplitude parameter is constant during the duration of a stimulus period.

6. A neural processor according to claim 1, wherein said duration parameter is represented by a relative timestamp.

7. A neural processor according to claim 6, wherein said timestamp is an integer timestamp.

8. A neural processor according to claim 1, wherein said axonal function includes a refractory period.

9. A neural processor according to claim 1, wherein said axon function includes a summation function.

10. A neural processor according to claim 1, wherein said axon function includes a threshold.

11. A neural processor according to claim 10, wherein said axon output signal is generated by said axon function when said threshold is exceeded and when said axon output was not generated during the previous said refractory period.

12. A neural processor according to claim 10, wherein a desired activity level is considered in selecting said threshold.

13. A neural processor according to claim 1, wherein said axon output signal is a square wave.

14. A neural processor according to claim 1, further including a neural topology, said neural topology defined by connecting at least one of said axon output of at least one of said at least one neural processing element with at least one of said dendrite input of at least one of another of said at least one neural processing element.

* * * * *